(12) United States Patent
Henry

(10) Patent No.: US 12,497,137 B2
(45) Date of Patent: Dec. 16, 2025

(54) BOAT SUN PROTECTION

(71) Applicant: Kenneth Henry, Bend, OR (US)

(72) Inventor: Kenneth Henry, Bend, OR (US)

( * ) Notice: Subject to any disclaimer, the term of this patent is extended or adjusted under 35 U.S.C. 154(b) by 651 days.

(21) Appl. No.: 17/879,633

(22) Filed: Aug. 2, 2022

(65) Prior Publication Data

US 2023/0030525 A1 Feb. 2, 2023

Related U.S. Application Data

(60) Provisional application No. 63/228,522, filed on Aug. 2, 2021.

(51) Int. Cl.
*B63B 17/02* (2006.01)
*B60J 3/02* (2006.01)
*B60J 11/00* (2006.01)

(52) U.S. Cl.
CPC ............... *B63B 17/02* (2013.01); *B60J 3/02* (2013.01); *B60J 11/00* (2013.01)

(58) Field of Classification Search
CPC .. B63B 17/00; B63B 17/02; B60J 3/00; B60J 3/02; B60J 11/00
USPC ........................................... 114/361
See application file for complete search history.

(56) References Cited

U.S. PATENT DOCUMENTS

| | | | | |
|---|---|---|---|---|
| 4,659,144 A | * | 4/1987 | Reese | B60J 1/2011 160/370.21 |
| 5,655,810 A | * | 8/1997 | Shikler | B60J 11/00 160/370.21 |
| 11,104,403 B2 | * | 8/2021 | Van Newhouse | B63B 17/02 |

* cited by examiner

*Primary Examiner* — Lars A Olson
(74) *Attorney, Agent, or Firm* — Donn K. Harms

(57) ABSTRACT

A shading device is provided which is removably engageable to provide shade protection from direct sunlight for the graphic display panels and steering wheel of a boat. The shading device is stretchable from a first shape to a second shape where it is maintained in a biased engagement with the boat steering wheel to thereby shade the steering wheel and any graphic displays adjacent thereto from direct sunlight.

8 Claims, 5 Drawing Sheets

BOAT SUN PROTECTION

This application claims priority to U.S. Provisional Patent application Ser. No. 63/228,522 filed on Aug. 2, 2021, which is incorporated herein in its entirety by this reference thereto.

BACKGROUND OF THE INVENTION

1. Field of the Invention

The present invention relates generally to boats, such as pleasure boats for skiing and wakeboarding. More particularly, it relates to a removably positionable shade panel to protect electronic displays and the steering wheel from sunlight exposure.

2. Prior Art

For many years, boats have been owned and enjoyed for water sports, such as waterskiing, wakeboarding and simply for driving. Such boats have evolved from simple instrumentation, such as engine gauges and speedometers to digitally displayed engine and speed gauging, as well as digitally displayed information about the current configuration of the boat.

Such an evolution from analog mechanical gauges to digital display panels has evolved because, modernly, many water sports boat manufacturers have developed systems to further enhance the shape of the wakes their boats create. Such wake shaping devices are employable to help lower the stern of the boat, which helps it create a larger and more predictable wake, which is especially desirable for wakeboarding and wakesurfing as well.

Employing various components on the boat and stern allow the operator to adjust the size and shape of the wake. The digital displays, such as liquid crystal displays on such boats, in addition to depicting speed and other engine operation parameters, will also depict the current configurations of various adjustable components on the boat which the operator has adjusted. The digital display panel or panels display all of this information to the operator, but due to the marine environment, these digital displays are subject to ongoing exposure to sunlight and water.

With respect to the above, before explaining at least one preferred embodiment of the sun protection device herein, it is to be understood that the disclosed sun protection device is not limited in application to the details of employment and to the arrangement of the components in the following description or illustrated in the drawings. The sun protection device herein, and construction and operation thereof disclosed, are capable of other embodiments, and of being practiced and carried out in various ways, all of which will be obvious to those skilled in the art once the information herein is reviewed.

Also, it is to be understood that the phraseology and terminology employed herein are for the purpose of description, and should not be regarded as limiting. As such, those skilled in the art will appreciate that the conception upon which this disclosure is based, may readily be utilized for other sun protection systems for marine craft. It is important, therefore, that the embodiments, objects and claims herein, be regarded as including such equivalent construction and methodology insofar as they do not depart from the spirit and scope of the present invention.

SUMMARY OF THE INVENTION

The sunlight protection system, disclosed herein, provides protection for the electronic displays, dash mounted instruments, and steering wheel of a boat. It is a flexible fabric removably positionable body which is adapted in size and shape to cover both electronic displays and the steering wheel of a boat or pleasure craft.

The device features a body portion which is formed of sun resistant material, such as canvas or other woven or knitted fabric having sufficient UV inhabitancy to survive long hours in the sun while protecting the boat components. The material forming the body is preferably substantially elastic yarn or thread or the like, such as spandex or elastic fabrics with similar properties of stretching, such that it can be stretched in both the horizontal and vertical directions at the same time to allow it to form shapes accommodating differing boat configurations. By horizontal and vertical directions is meant that the body is stretchable along the lines of the first yarns forming said body running a first direction or horizontally and is stretchable along a second direction along the direction of secondary yarns forming said body intertwined or woven or knitted with said first yarns and running traverse or substantially normal to said first direction. Thus, the body can be stretched to configurations in both horizontal and vertical directions to change shape to cover desired display panels and the steering wheel of a boat, while the weighted edge of the body holds that edge on the dashboard of the boat.

Currently, a substantially triangular un-stretched or first shape, wherein the elastic side edge is substantially curved in a "V" shape and the side of the body which mounts on the dashboard, has a slight curve is the preferred configuration of the cover. From this initial un-stretch or first shape, using the elastic material of the body which is preferably UV inhibiting, the body of the device is stretchable in multiple directions to allow the user to stretch it to a second shape which will be a shape which covers and blocks sunlight communication to any electronic displays on the dashboard, as well as to block such sunlight from communication with the steering wheel. The body is held in this second shape by the biased contact of the elastic edge over and around the steering wheel at least and around outside edges of the display panels where they project from a dashboard mount. By elastic material herein is meant that the woven or knitted fabric is formed of substantially elastic yarn, such as Spandex, or combinations of elastic yarn with nylon and polyester, or other polymeric yarns in weaves forming fabric sheets which may be stretched both along width and length.

The shading device herein, so configured to assume multiple shapes with an elastic edge and weighted or securable edge, is especially useful for deployment to protect such electronic displays and steering wheels when the boat is parked for ongoing periods of time. When parked, the electronic display components, as well as the steering wheel, are subjected to the risk of intense sunlight and heating which occurs therefrom.

In all modes of the device herein, a dashboard mount on one portion or a weighted portion of the perimeter edge of the body is provided to hold it in place. This mount may either be weights or a weighted edge or may be an edge configured for engagement with a flexible mount that is configurable in shape to be positioned on the dashboard.

Where the body of the cover herein is not operatively engaged with a mount, the edge of the body is preferably filled with weighting material, such as metal or plastic beads, sand, or other weighting material. Such weighting material will be flexible when positioned within the interior cavity defined by the flexible mount sidewall of the flexible mount. This forms a flexible mounting edge which will bend and curve and assume a shape complementary to the shape of the dashboard of the boat where it meets the windshield.

The flexible body formed of fabric herein is sewn or otherwise connected to the flexible mount on this dashboard mounting edge. Configured with this flexible mount, or an engageable edge thereto, the flexible body is held in a proper position to provide shade from sunlight to the digital display or displays which the boat has on the dashboard, and preferably also the steering wheel.

In a preferred mode of the device, the flexible elastic body is permanently engaged to such a flexible mount by forming it into a side edge. In this mode, the mount formed by the mounting edge is simply positioned on the dashboard or assumes a shape when positioned atop the dashboard. Once the flexible mount is so positioned, the flexible body, especially if formed of elastic material, is pulled and adjusted by hand to extend from the mounting edge and to cover the digital displays and steering wheel.

In another mode of the device herein, which may not be as easily adapted to multiple boats, a flexible mount may be removably engageable to the flexible body. In this mode, an elongated flexible mount will have a primary fastener thereon which is complementary to a secondary fastener positioned on the flexible body. This may be an open edge of a mount in which a curved mounting edge of the body may be for example slid into a connection.

The flexible body can be customized in shape such that it is adapted to fit and cover the digital displays and steering wheel of a specific individual boat model. This customized mode of the device may be configured with fabric material which has yarn that is less elasticity or is not elastic in nature. This configuration allows for the flexible mount on a mounting edge to be configured to adapt to the curve and shape of the boat onto which it is positioned and to have the customized flexible body, which is adapted for the dashboard and steering wheel of that boat to be engaged.

In all modes of the device, the sidewall of the flexible mount and the body of the flexible cover are preferably formed of UV resistant material such as SUNBRELLA when not elastic in nature or spandex or other elastic type fabric woven with UV resistant nylon, polyester, or other polymeric yarns when formed of elastic material.

With respect to the above description, before explaining at least one preferred embodiment of the herein disclosed protective covering system for boats, it is to be understood that the invention is not limited in its application to the details of construction and to the arrangement of the components in the following description or illustrated in the drawings. The herein described dash and instrument covering system for boats is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based, may readily be utilized as a basis for designing of other removably positionable protective covering systems for the electronic displays and steering wheels of boats, and for carrying out the several purposes of the present disclosed system and method. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Finally, the term "substantially" if not otherwise defined for size or dimension or positioning of a specific part or configuration, means plus or minus ten percent.

It is an object of this invention to provide a shading device which is easily positioned and removed on a dashboard of a boat and which will provide protection from sunlight to electronic displays and components and the steering wheel of the boat on which it engages.

Other objects, features, and advantages of the presently disclosed sun protective device for electronic displays and components of a boat, as well as the advantages thereof over existing prior art, will become apparent from the description to follow, and are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the various modes of the sunlight protective invention herein which as noted may be employed through engagement to existing and new bridges. It is intended that the embodiments and figures disclosed herein are to be considered illustrative rather than limiting.

Figure 3:
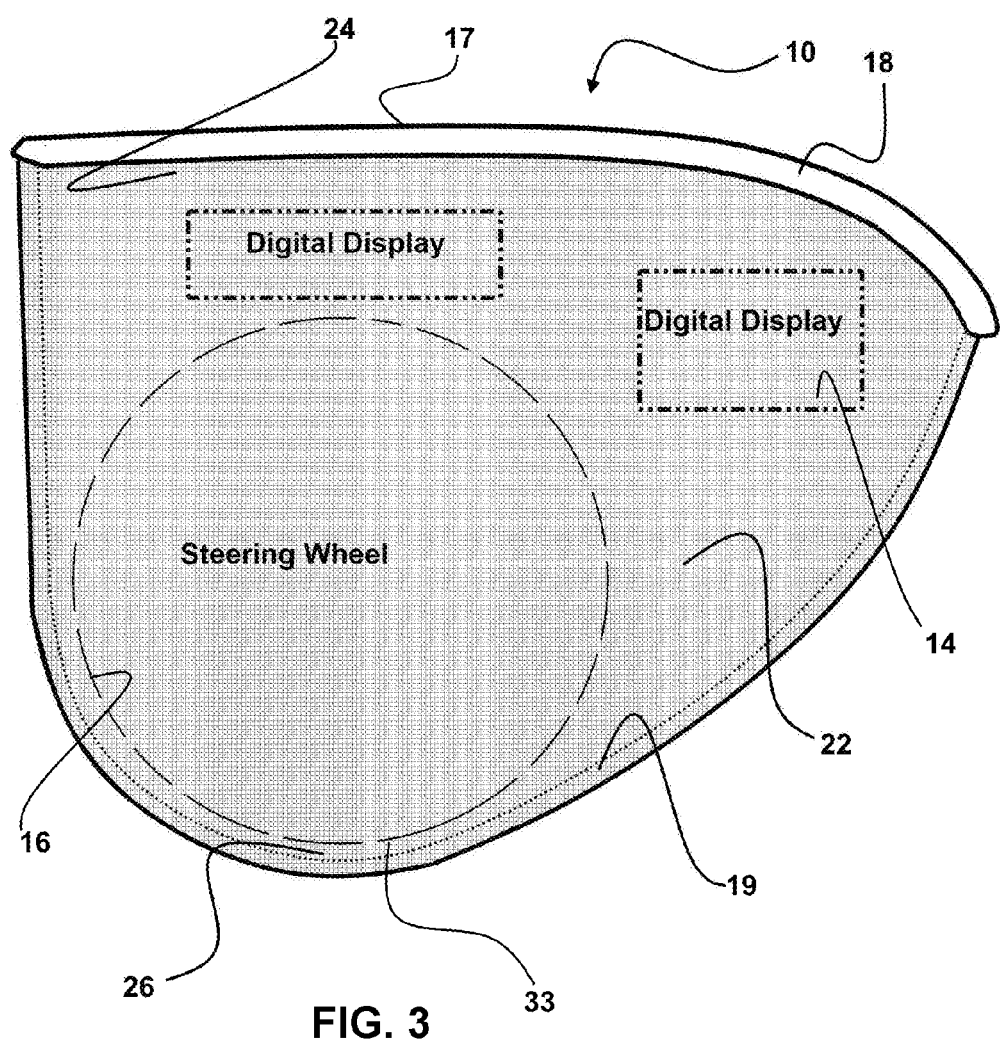
FIG. 3 shows a mode of the device where the body of the cover is similar in shape to that of FIG. 2 wherein the body is held stationary on the dashboard by a flexible mount formed by a weighted portion or by an alternative formed by engagement of one edge of the body to a flexible mount positionable on the dashboard and the elastic edge portions secure around the display and steering wheel.
Figure 4:
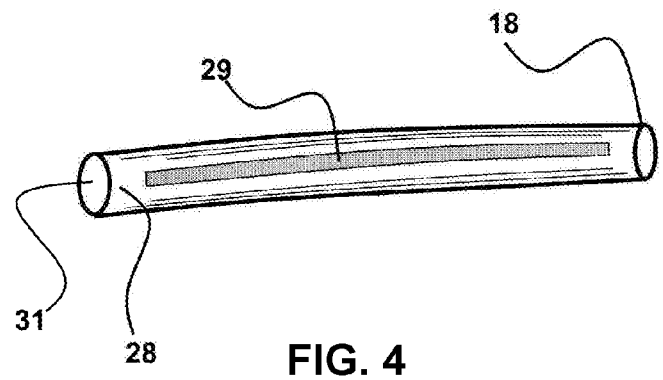

FIG. 4 a dashboard-positionable flexible mount which is engageable to one edge of the flexible fabric body and functions as the weighted portion of FIG. 3.

Figure 2:
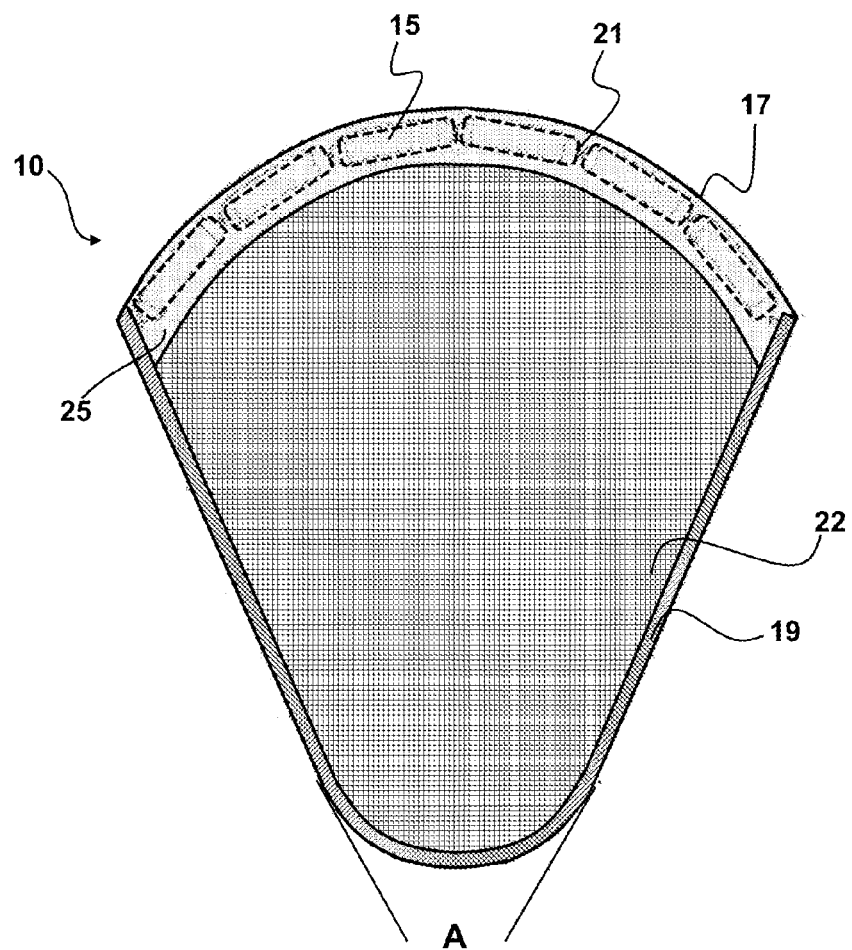
FIG. 2 depicts one preferred body configuration in a first shape or collapsed mode of the body of the device herein, wherein it has a flexible mount edge formed of a weighted perimeter edge portion and an elastic perimeter edge portion providing a removable engagement to and around the steering wheel and dashboard of a boat and formed to a substantially V shape when un-stretched.
Figure 5:
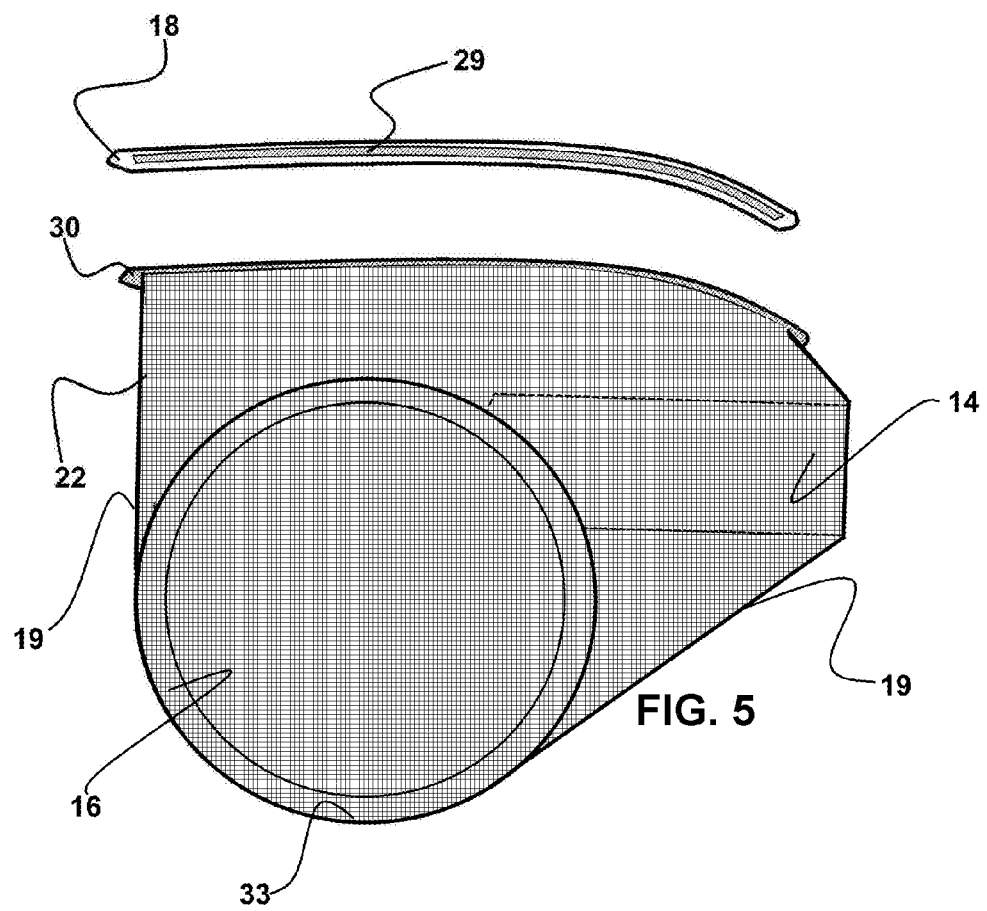

FIG. 5 depicts an example of the shading device herein in an expanded and mounted configuration or second shape from the contracted position or first shape of FIG. 2 and employing the weighted flexible mount of FIG. 4 located on a mounting edge of the body and the elastic edge on the other perimeter portions.

Figure 6:
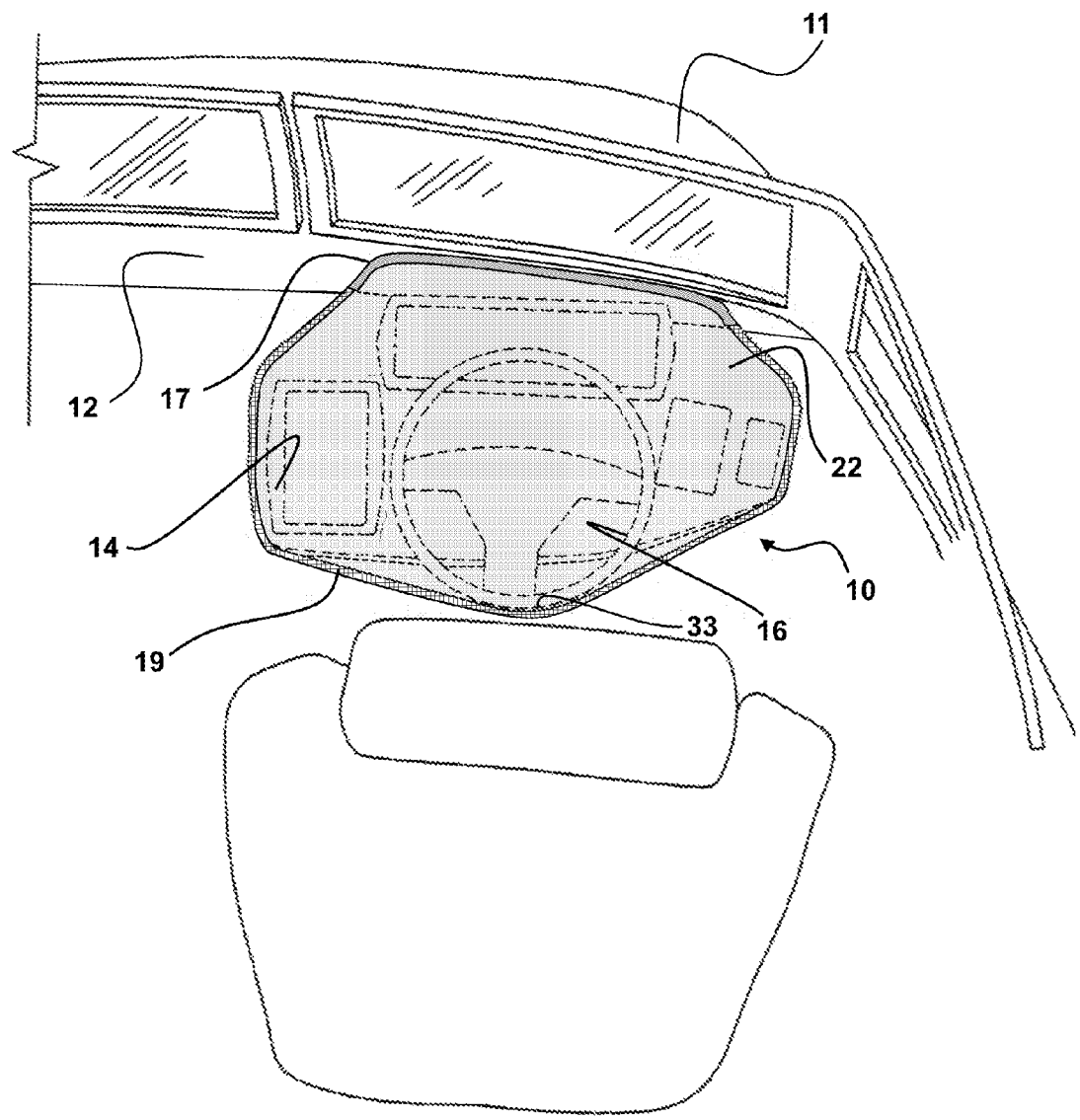

FIG. 6 shows the device, as in FIG. 2, wherein the fabric of the body has been stretched to the second shape in biased operative positioning to cover the dashboard and digital displays and the steering wheel of the boat, where it is held to the dashboard by the weighted portion of the edge which is formed into or connected to the mounting edge of the fabric body and held to the steering wheel by a wrapping therearound to form a biased contact with it.

DETAILED DESCRIPTION OF THE PREFERRED EMBODIMENTS OF THE INVENTION

In this description, the directional prepositions of up, upwardly, down, downwardly, front, back, top, upper, bottom, lower, left, right, first, second, and other such terms refer to the components of the device herein as they may be oriented and appears in the drawings and are used for convenience only, and they are not intended to be limiting or to imply that the components depicted herein have to be used or positioned in any particular orientation.

Figure 1:
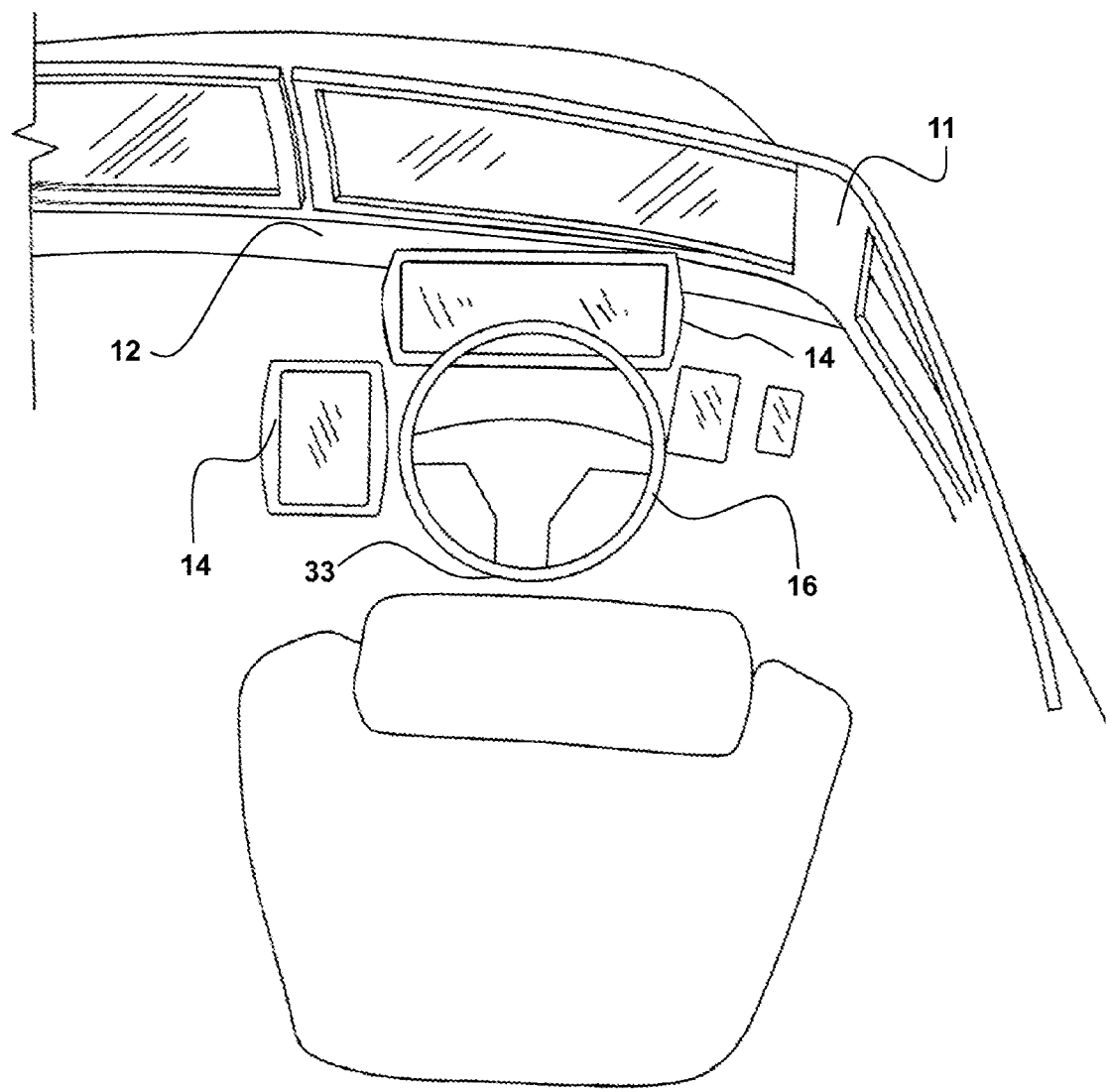
FIG. 1 depicts a view of a conventional dashboard of a conventional boat or water craft and shows a conventional positioning of the digital displays and steering wheel operatively engaged therewith which are exposed to sunlight.

Now referring to drawings in FIGS. 1-6 wherein similar components are identified by like reference numerals, there is seen in FIG. 1 an overhead view of a conventional dashboard 12 of a conventional boat or water craft 11. FIG. 1 also shows a depiction of a digital display 14 and the steering wheel 16, which are operatively engaged therewith. By digital display 14 is meant any liquid crystal flat panel type display, such as that found on laptop computers, monitors, and widely used in vehicles and boats.

Shown in FIG. 2 is a particularly preferred mode of the device 10 herein showing the flexible body 22 positioned in a collapsed mode of the device 10. In all modes of the device 10, a flexible mount 18 is provided to mount or hold the flexible body 22 removably engaged on the dashboard by positioning the mount 18 on the dashboard 12. By flexible mount 18 is meant either positioning of a weighted perimeter edge portion 17 on one side of the body 22 or forming one side as a weighted flexible mount 18 which is separate from the body 22, such as in FIG. 5, but is malleable to the contours of the dashboard 12 and engageable to one side of the body 22.

It is preferred, as shown in FIG. 2, that the weighted perimeter edge portion 17 is substantially curved in shape and forms one side or the base of a substantially inverted triangular shape for the body 22. This triangular shape of the unmounted body 22 is preferred as experimentation has shown this shape to provide an ability to stretch to cover a wide variety of steering wheels and gauges and LCD screens and still allows for the elongated flexible mount 18 to be positioned on a dashboard to hold the device 10 in operative engagement.

As shown in FIG. 2, this flexible mount may be formed in a weighted perimeter edge 17 portion of the body 22. As shown, a plurality of individual weights 15 engaged therein or thereto. Such weights 15 may be formed of metal, such as lead weights or chain, or of bags filled with sand or pellets or similar flexible weighted components. Preferably, the weights 15 engaged with the perimeter edge 17 portion are formed of non rusting material. As noted below, the weighted perimeter edge 17 can also include the engaged or engageable flexible mount 18 to provide the flexible weight to hold the device 10 in place.

To maintain the weighted perimeter edge portion 17 flexible and having evenly distributed weight across substantially the entire distance thereof, the individual weights 15 are preferably engaged with flexible or pivoting connections 21 to each other in a chain like structure. Such pivoting connections may be loops on each end of each weight 15 engaged to loops and adjacent weights 15, or by rope or twine connecting the weights 15, or other flexible connections. This connection maintains the individual weights 15 in a sequenced line and allows a pivoting between each of the engaged weights 15 to thereby allow the edge to curve and adapt to the contour of the surface of the dashboard 12.

To maintain a padded contact with the dashboard 12, preferably the weights 15, in such flexible or pivoting connections 21, are located within a hollow passage 25 formed along the distance of the weighted perimeter edge portion 17. Such may be achieved by folding over the edge of the fabric forming the flexible body 22 along the distance of the weighted perimeter edge 17 portion and sewing it to form the passage 25. This may be done with the weights 15 in place, or they may be pulled in later, if an opening is left providing access to the passage 25.

The flexible body 22 is preferably formed of thread or yarn which will stretch along with the flexible elastic edge 19 portion of the body 22. For example, the yarn or thread which is woven or knitted to form the fabric of the body 22 may include elastic fibers such as one or a combination of Diene elastomeric fibers (rubber threads,) Polyurethane Fiber (Spandex), Polyether Ester Elastomer Fibers, and Composite Elastomeric Fibers. When included in the woven or knitted material forming the body 22, in both the length and width of the fabric, elastic material allows the formed body 22 to stretch in any direction to stretch over and cover the components noted. This elastic nature of the fabric to stretch in all directions, thereby provides a removable engagement to and around the steering wheel 16, digital displays 14, and the dashboard 12 of a boat.

The elastic edge portion 19 of the perimeter edge of the body 22, in all modes herein, preferably, extends in a curve from the opposing ends of the weighted perimeter edge portion 17. In this preferred mode of the device 10 it stretches from this first shape more easily and fits multiple different boats and steering wheels using the curved base of a substantially "V" or triangular shaped body 22.

The peak, at a central area of this curved elastic edge portion 19 defining the shape of the body, curves around at an angle A relative to the two sides thereof having the elastic edge 19. This angle is currently substantially between 40-60 degrees, with a current favored angle of the two side edges approaching the curved central portion being 44-54 degrees. This elastic edge portion 19 may simply be formed of the flexible fabric forming the body 22, which is hemmed or folded over and sewn. However, additional retracting biasing force can be achieved by sewing rubber rope, (not shown but well known), elastic banding, or similar material which will stretch and return to an original size in or to the elastic edge 19 portion of the body 22.

This elastic edge portion 19 of the body helps to hold the body 22 mounted over and around the edge of components such as the steering wheel 16 by folding the edge of the elastic edge portion 19 around the steering wheel 16 and/or the displays 14 on a side of the body 22 positioned opposite the weighted edge 17 portion of the perimeter edge. This stretching over and around causes an inward bias of the elastic edge portion 19 to hold it on the various components it wraps around.

Such is shown in FIG. 3, for example, wherein a weighted perimeter edge portion 17 of the body 22 is placed on the dashboard 12 in the form of a weighted edge with weights 15 thereon or in the form of an engaged weighted flexible mount 18 which has been engaged to the body 22 to form the weighted edge portion 17. As shown and noted herein, the flexible mount 18 may be filled with flexible weighted material such as weights 15, fluid, pellets or the like. It may also be formed to a shape complementary with the shape and contour of the dashboard 12, such as where it meets with the windshield 20.

In one preferred mode of the device 10 herein, the flexible mount 18, providing the weighted edge portion 17, can be permanently engaged with a flexible body 22, as shown in FIG. 3. In another preferred mode of the device 10 herein, multiple differently configured flexible mounts 18, in the form of flexible bodies 22, can be engaged to the flexible mount 18 or to the edge of the body where the flexible mount 18 would be, as in FIG. 5.

In FIG. 3 is also shown the mode of the device 10 wherein the flexible mount 18 is formed to one which will bend to fit a particular dashboard 12 shape. The flexible body 22, formed of sun resistant fabric, may be configured in a shape which conforms in shape and contour to cover the steering wheel and any digital displays positioned on the dashboard 12. As noted, where the shape is to be substantially universal to be employed on multiple boats of similar configuration, the "V" shape would be preferred to allow it to stretch to fit.

As also shown in FIG. 3, a first edge 24 of the flexible body 22 is provided, with the weighted edge portion 17, through the engagement of the flexible mount 18. The body extends therefrom and is held in place by the weight of the weighted edge portion 17 of the flexible body 22.

A second edge 26 of the flexible body 22 extends from a first end of the flexible mount 18 to an opposing second end of the flexible mount 18. An elastic edge portion 19 of the body 22 is provided by either the sewn fabric of the body, if elastic in construction, or rubber rope or elastic ribbon or the like (not shown but well known) engaged along this elastic edge portion 19. As noted, the biasing from the elastic edge portion 19 to contract, once stretched over the steering wheel 16 and other components, helps considerably to hold the body 22 in place and keep from moving in wind and such. This elastic edge portion 19 would, in the "V" shaped body, form the two legs or curved shape of the "V" and the flexible mount 18 will extend between the distal ends of the two legs.

In FIG. 4 is shown an enlarged portion of the flexible mount 18 which, as noted, can provide the weighted perimeter edge 17. As shown, it has a sidewall 28 which is formed of sun resistant material. The sidewall 28 defines an interior cavity 31 of the flexible mount 18 in which flexible weighted material is held, such as metal or plastic beads or balls or sand or chain, liquid, or other flexible weight material.

The flexible mount 18 of FIG. 4 is configured with a first fastener 29, such as hook and loop fabric, or snaps, or buttons, or the like, which render it removably engageable with any flexible body 22 which has a second fastener 30 (FIG. 5) thereon adapted to removably engage with the first fasteners 29. This allows for the engagement of different configurations of the flexible body 22. Each of which can be configured with a shape adapted to cover both the digital displays 14 as well as the steering wheel 16.

An example of a the device 10 wherein the weighted edge portion 17 is formed on the body 22 is shown in FIG. 5. As shown, the second fastener 30 positioned on the flexible body 22 is adapted to removably engage with the first fastener 29 on the flexible mount 18.

In FIG. 6 is shown the device 10 with the body 22 stretched and held in the second shape. As shown, the weighted edge portion 17 of the perimeter of the body 22 is operatively positioned on the dashboard 12 and held there by the weighted edge portion 17. The flexible body 22 is stretched to the second shape where it is configured to cover the digital displays 14 and steering wheel 16 from sunlight contact therewith by the positioning of the fabric forming the flexible body 22 therebetween. In the second shape, the elastic edge 19 has been stretched and allowed to retract to allow it to curve around and be held by a biased engagement in this second shape. By biased engagement of the body 22 is meant that it has the weighted edge 17 operatively located on the dashboard 12 and is held there, and that the elastic edge 19 is stretched past and engages at least around the outside edge 33 of the steering wheel 16 opposite the edge thereof closest to the dashboard 12. This elastic edge 19 can also engage around outside edges of the displays 14 if the displays project from the dashboard 12 and are not flush therewith. If the displays 14 are flush mount on the dashboard front, then the body 22 held in the second shape by the biased engagement will shade them since, as shown, sunlight is substantially blocked from direct contact with the steering wheel 16 and the displays 14 by the fabric forming the flexible body 22.

The description of the features of the device, herein, does not limit the claims of this application, and other applications developed by those skilled in the art upon reviewing this application are considered to be included in this invention.

It is additionally noted and anticipated that although the depictions and disclosure of the device herein is shown in its most simple form and operation, potential configurations, various components, and aspects of the disclosed system may be differently arranged or slightly modified when forming the invention herein. As such, those skilled in the art will appreciate the descriptions and depictions set forth in this disclosure are merely meant to portray examples of preferred modes of the sun protection device herein within the overall scope and intent of the invention, and are not to be considered limiting in any manner.

Further, while all of the fundamental characteristics and features of the sun protection device for a boat have been shown and described herein, with reference to particular embodiments thereof, a latitude of modification, various changes and substitutions are intended in the foregoing disclosure as well as the claims which follow, and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A shading apparatus for the graphic display panels and steering wheel of a boat, comprising:
a flexible body having a first shape;
said body having a weighted edge;

said body having an elastic edge extending therearound from a first end of said weighted edge to a second end of said weighted edge opposite said first end thereof;

said weighted edge for positioning on a dashboard of said boat to removably hold said weighted edge positioned thereon;

a flexible mount positionable on said dashboard;

said flexible mount having a first fastener running a length thereon;

a second fastener running along said weighted edge of said body, said second fastener removably engageable to said first fastener along said length thereof; and said body stretchable to a second shape with said elastic edge positioned to a biased engagement with an outside edge of a steering wheel of said boat with said weighted edge removably positioned on said dashboard, whereby said body shades said display panels and steering wheel from direct contact from sunlight.

2. The shading apparatus of claim 1, additionally comprising:

said flexible body formed of elastic material which is stretchable in both horizontal and vertical directions.

3. The shading apparatus of claim 1, wherein said first shape of said body is substantially a V shape which is defined by said elastic edge extending between said first end of said weighted edge and said second end of said weighted edge.

4. The shading apparatus of claim 2, wherein said first shape of said body is substantially a V shape which is defined by said elastic edge extending between said first end of said weighted edge and said second end of said weighted edge.

5. The shading apparatus of claim 1, wherein said weighted edge comprises:

a sidewall running along said weighted edge of said body, said sidewall defining an interior cavity; and flexible weights positioned within said interior cavity.

6. The shading apparatus of claim 2, wherein said weighted edge comprises:

a sidewall running along said weighted edge of said body, said sidewall defining an interior cavity; and flexible weights positioned within said interior cavity.

7. The shading apparatus of claim 3, wherein said weighted edge comprises:

a sidewall running along said weighted edge of said body, said sidewall defining an interior cavity; and flexible weights positioned within said interior cavity.

8. The shading apparatus of claim 4, wherein said weighted edge comprises:

a sidewall running along said weighted edge of said body, said sidewall defining an interior cavity; and flexible weights positioned within said interior cavity.

* * * * *